United States Patent [19]

Sorensen

[11] Patent Number: 4,903,340
[45] Date of Patent: Feb. 20, 1990

[54] OPTICAL DATA CONNECTOR HAVING MAGNETIC INTERCONNECT SENSOR

[75] Inventor: Jay R. Sorensen, Aloha, Oreg.

[73] Assignee: SpaceLabs, Inc., Bothell, Wash.

[21] Appl. No.: 172,326

[22] Filed: Mar. 23, 1988

[51] Int. Cl.$^4$ ............................................. H04B 9/00
[52] U.S. Cl. .................................. 455/617; 350/96.2; 455/612
[58] Field of Search ............... 455/601, 603, 606, 607, 455/608, 609, 613, 612, 617, 618, 619; 350/96.15, 96.16, 96.2, 96.21, 96.22

[56] References Cited

U.S. PATENT DOCUMENTS

| 4,196,347 | 4/1980 | Hadley | 455/603 |
| 4,412,355 | 10/1983 | Torbrack | 455/617 |
| 4,784,001 | 11/1988 | Gaetner | 455/608 |

FOREIGN PATENT DOCUMENTS

| 2523393 | 9/1983 | France | 455/612 |
| 0010827 | 1/1985 | Japan | 455/612 |
| 0149904 | 8/1985 | Japan | 455/612 |
| 2103446 | 2/1983 | United Kingdom | 455/612 |

Primary Examiner—Benedict V. Safourek
Assistant Examiner—Leslie Van Beek
Attorney, Agent, or Firm—Seed and Berry

[57] ABSTRACT

An optical data link for transferring data between a pair of connectors and for activating an electrical device to which one of the connectors is attached. A light-emitting diode (LED) and a phototransistor are mounted in each of the connectors, with the LED of each connector visible to the phototransistor of the other connector when the connectors engage each other. The LEDs and phototransistors are connected to respective interface circuits. The interface circuits for at least one of the LEDs limits the current through the LED regardless of the amplitude of a driving signal. The interface circuits for the phototransistors maintain a relatively constant voltage across the phototransistors so that the phototransistors function as current switches. The electrical device is activated in response to closure of a magnetically sensitive reed switch mounted in the connector attached to the electrical device. The switch is closed when the connectors engage each other by the magnetic field generated by a magnet mounted in the other connector.

21 Claims, 2 Drawing Sheets

OPTICAL DATA CONNECTOR HAVING MAGNETIC INTERCONNECT SENSOR

FIELD OF THE INVENTION

This invention relates to an optical data link, and more particularly, to a connector for an optical data link that electrically activates an electronic device when the connector is plugged into the electronic device.

BACKGROUND ART

Many types of electrical devices are powered by self-contained batteries. The batteries typically have a finite life after which they must be either replaced or recharged. Consequently, it is generally desirable to disconnect the batteries from the device that is being powered when the device is not being used. For example, if the function of the electrical device is to output data to a second device, a switch may be turned off to electrically deactivate the device when the electrical device is not connected to the second device.

Electrical devices are typically connected to each other through electrical cables that mate with the electrical devices through electrical connectors. These connectors typically include a multi-pin plug that is inserted into a correspondingly configured socket. In the event that the electrical device is battery powered, the battery can be automatically disconnected from the device when the plug is removed from the socket. This function can be accomplished by connecting the battery for the electrical device in series with two pins of a socket mounted on the device, and then interconnecting two corresponding pins of the plug. When the plug is inserted into the socket, a circuit is completed through the plug and socket, thereby connecting the battery to the components of the electrical device. As a result, the electrical device is automatically activated when the plug is inserted in the socket.

While electrical connectors can be used to transmit data between electrical devices under most circumstances, certain applications require the use of alternative data links. For example, under some circumstances it is important to electrically isolate devices between which data is to be transmitted. In other situations, such as where electromagnetic pulses (EMPs) or electromagnetic interference (EMI) may be encountered, electrical conductors cannot be used. Furthermore, electrical components connected to electrical conductors can be damaged by static electricity discharged onto the conductors. One alternative data link that can be used is an optical data link having a light emitter in a first connector member optically coupled to a light detector in a second connector member. Data is transmitted from the first connector member to the second connector member by modulating the light emitter in the first connector member in a binary manner and then detecting the modulated light with the light detector in the second connector member. The optical data link can also be made bidirectional by mounting a second light emitter in the second connector member and a second light detector in the first connector member.

Although the above-described optical link can be used in many applications, it is generally not suitable for use in an application where an electrical, battery powered device is to be activated automatically when a connector is plugged into the device. An optical link cannot be used in this application because the optical connector does not have any electrical pins that can be interconnected to connect the battery to the device when the connector is plugged into the electrical device. Consequently, it has not been considered possible to use an optical data link for automatically activating an electrical device when the data link connector is plugged into the device.

DISCLOSURE OF THE INVENTION

It is an object of the invention to provide an optical data link having a connector that electrically activates an electrical device when the connector is plugged into the electrical device.

It is another object of the invention to provide an electrically activating, optical data link connector that is relatively inexpensive and uses conventional, commonly available electrical components.

These and other objects of the invention are provided by an optical data link for transferring data from a first connector to a second connector. A first optical communication component is mounted in one of the connectors, and it emits light as a function of a binary data signal. A second optical communication component, such as a phototransistor, is mounted in the other connector, and it detects light emitted by the first optical component when the first and second connectors engage each other. The data link also actuates an electrical device connected to the second connector when the first and second connectors engage each other. A magnet is mounted in the first connector, and a magnetically sensitive switch is mounted in the second connector so that the magnetic field from the magnet closes the switch when the first and second connectors engage each other. The switch is connected to the electrical device to activate the electrical device when the switch is closed. The data link may include a second light-emitting component and a second light-detecting component to provide bidirectional data transfer to and from said electrical device. The light-detecting component is preferably a phototransistor, and it is preferably connected to an interface circuit that maintains a substantially constant voltage across the phototransistor to allow it to function as a current switch. The light-emitting component is preferably a light-emitting diode, and it is preferably driven by an interface circuit that limits the current flow through the light-emitting diode when the binary data signal is applied to the light-emitting diode.

BEST MODE FOR CARRYING OUT THE INVENTION

Figure 1:
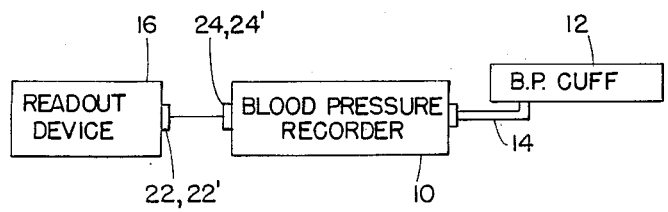
FIG. 1 is a schematic of one application for the magnetically activating optical data link.

One application for the magnetically activating optical data link is illustrated in FIG. 1. In this application, a conventional ambulatory blood pressure recorder 10 is connected to a conventional blood pressure cuff 12 through a pneumatic tube 14. The monitor 10 is typically worn by the patient throughout the day so that the patient's blood pressure can be periodically measured and recorded in the recorder 10. The data stored in the recorder 10 is read out at the termination of the test into a conventional readout device 16 which produces a visual hard-copy record of the patient's blood pressure for examination by a physician.

One method of allowing data to be transferred from the blood pressure recorder 10 to the readout device, while still electrically isolating the recorder 10 from the readout device 16, is to connect the recorder 10 to the readout device 16 through an optical data link. The optical data link includes an optical fiber cable 20 extending between a pair of optical connectors 22, 24. The optical connector 22 plugs into a suitable receptacle (not shown) in the readout device 16, while the optical connector 24 plugs into a suitable receptacle (not shown) in the blood pressure recorder 10. The recorder 10 includes a light emitter (not shown) adjacent its receptacle that is modulated in a binary manner. The light from the emitter is coupled through the optical fiber cable 20 to a light detector (not shown) mounted in the readout device 16 adjacent its connector. In a similar manner, the readout device 16 can include a light emitter and the recorder 10 can include a light detector to allow data or control signals to be transmitted from the readout device 16 to the recorder 10.

As an alternative to the use of an optical fiber cable 20, an electrical cable 20' can be electrically connected to the readout device 16 through an electrical connector 22'. The optical connector 24 that plugs into the recorder 10 then contains the light detector that would otherwise be mounted in the readout device if an optical fiber cable were used. The optical connector 24 would also contain a light emitter for bidirectional data transfer. Light is coupled from the light emitter in the recorder 10 (and to the light detector in a bidirectional system) in the same manner as if an optical fiber is used except that the coupling is direct rather than through an optical fiber cable.

When the recorder 10 is not being used to perform blood pressure measurements, it should be de-energized in order to preserve the life of the battery between replacement or recharging. Regardless of which of the two abovedescribed approaches is used, a limitation of optical data links is their inability to automatically energize the blood pressure recorder 10 when it is connected to the readout device 16. The optical connector 24 does not include any electrical pins that make contact with an electrical socket in the recorder 10. As a result, it is not possible to place the battery powering the recorder 10 in series with these contacts. An optical data link would thus seem unusable where the recorder 10 is to be automatically energized when the connector 24 is plugged into the recorder 10.

Figure 2:
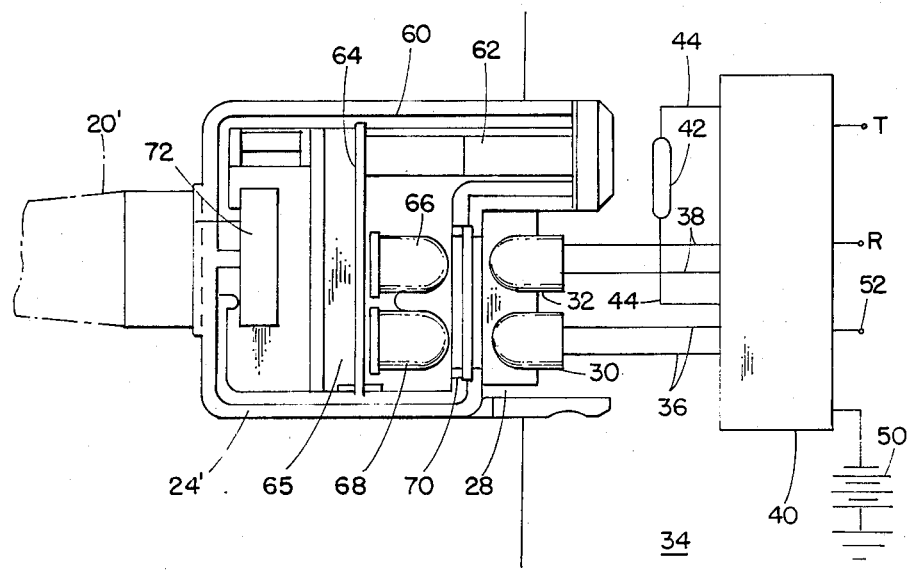
FIG. 2 is a plan view of the magnetically activating optical data link.

However, it has been found that an electrical device can be automatically energized when the optical connector of an optical data link is plugged into the device using a magnet embedded in the connector 24 and a magnetically sensitive reed switch mounted in the recorder 10. One embodiment of an optical data link that can automatically energize an electrical device, such as the recorder 10, is illustrated in FIG. 2. The blood pressure recorder 10 includes an optical connector 28 that is adapted to mate with the connector 24' (FIG. 1) on the cable 20'. A conventional light emitter 30, such as a light-emitting diode, and a conventional light detector 32, such as a photosensitive transistor, are mounted on a circuit board 34 in the recorder 10 adjacent the connector 28. The light emitter 30 and the light detector 32 each include a pair of leads 36, 38, respectively, that are connected to an interface circuit 40 described in detail below. A conventional, magnetically sensitive reed switch 42 is also mounted on the circuit board 34 adjacent the connector 28 and is connected to the interface circuit 40 through a pair of leads 44.

As explained in greater detail below, a battery 50 is connected to a positive power supply terminal 52 through the reed switch 42 and leads 44 to supply power to the recorder 10 when the reed switch is closed. The recorder 10 contains a conventional circuitry that need not be explained in detail here. Other electrical devices will, of course, utilize other circuitry, but they will also be powered by a DC voltage supplied by a battery 50. Circuits requiring multiple or differing polarity voltages can be powered by multiple batteries through multiple reed switches.

The connector 24' mounted on the cable 20' includes a housing 60 adapted to fit into the connector 28 in the recorder 10. The housing 60 encloses a bar magnet 62 and a circuit board 64 on which are mounted a number of electrical components of a cable interface circuit 65 described below, including a conventional light emitter 66 and a conventional light detector 68. The light emitter 66 in the connector 24' is mounted opposite the light detector 32 in the connector 28 while the light detector 68 in the connector 24' is mounted opposite the light emitter 30 in the connector 28. A transparent window 70 is formed in the housing 60 adjacent the light emitter 66 and light detector 68. The transparent window 70 allows the light emitter 30 to communicate with the light detector 68 and the light emitter 66 to communicate with the light detector 32. Conductors in the cable 20' terminate at the circuit board 64. A strain relief member 72 is formed at the end of the cable 20' to resist axial forces exerted on the cable 20'.

Figure 3:
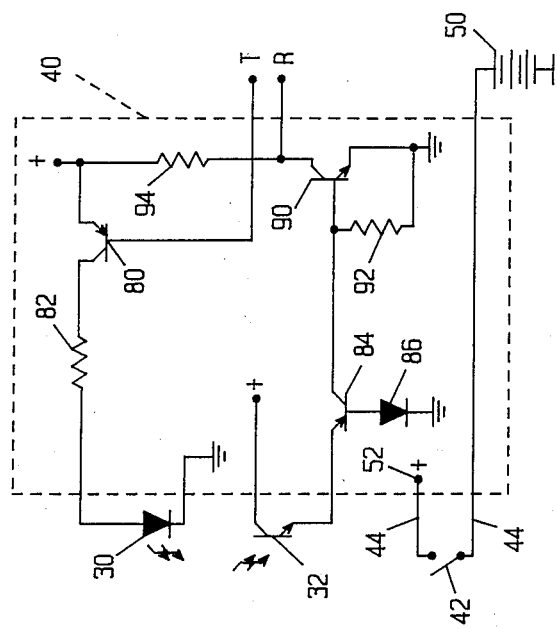
FIG. 3 is a schematic of an interface circuit for the portion of the magnetically activating optical data link mounted in the electrically powered device.

The interface circuit 40 in the recorder 10, as illustrated in FIG. 3, receives a binary transmit signal "T" and outputs a binary receive signal "R". These signals have one of two values which, in accordance with conventional RS-232 practice, are positive and negative voltages having an absolute value of at least 5 volts. The transmit signal T is applied to the base of a transistor switch 80 to turn transistor 80 on and allow current to flow through the light emitter 30 (i.e., a light-emitting diode) and a current-limiting resistor 82 when the transmit signal T is negative. When the transmit signal is positive, the base-emitter junction of transistor 80 is reverse biased to cut off transistor 80 and terminate the flow of current through the light emitter 30.

The light detector 32 is a conventional phototransistor switch that becomes conductive when it is illuminated. The transistor does not have a base connection. As a result, there is no discharge path for the transistor's Miller capacitance, and this capacitance can cause a relatively slow switching speed if the collector-to-emitter voltage varies appreciably. It is therefore important to maintain the voltage across the phototransistor 32 relatively constant so that the phototransistor functions as a current switch. When the phototransistor becomes conductive, the voltage on the emitter of phototransistor 32 is maintained at about 1.4 volts by the current flow through the base/emitter junction of transistor 84 and diode 86. When the phototransistor 32 is cut off, its emitter is floating, since the phototransistor 32 does not supply any current to the emitter of transistor 84 to turn transistor 84 on. Thus, the voltage across phototransistor 32 remains relatively constant to minimize the effect of the Miller capacitance.

As mentioned above, the phototransistor is cut off when it is not exposed to light, thereby cutting off transistor 84. The base of transistor 90 is then biased to ground through resistor 92 to hold transistor 90 at cutoff. Under these circumstances, the receive signal R receives the supply voltage through resistor 94. Thus, when the phototransistor 32 does not detect light, the receive signal R is high.

As explained earlier, when the photodetector 32 detects light, it supplies current to the transistor 84 to turn on transistor 84. The transistor 84 then turns on transistor 90 to pull the receive signal down to zero volts. Thus, when the phototransistor 32 detects light, the receive signal R is low.

Figure 4:
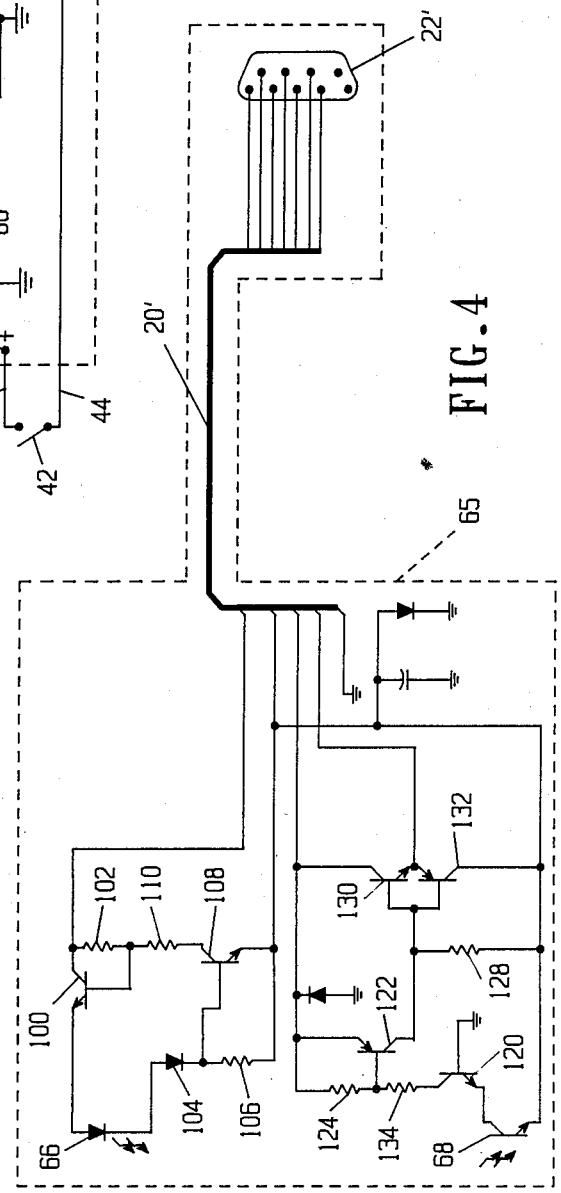
FIG. 4 is a schematic of an interface circuit for the portion of the magnetically activating optical data link mounted in an optical connector.

The interface circuit 65 in the connector 24' is somewhat similar in structure and operation to the interface circuit 40 in the recorder 10. The interface circuit 65, as illustrated in FIG. 4, likewise receives a transmit signal TXD and generates a receive signal RXD. However, the interface circuit 65 also receives a negative power supply signal in addition to the positive power supply signal received by the interface circuit 40. Thus, while the interface circuit 40 outputs a receive signal R that varies between 0 and a positive voltage, the interface circuit 65 outputs a receive signal RXD that varies between positive and negative voltages.

The transmit signal TXD is applied to the emitter of transistor 100 and to the base of transistor 100 through resistor 102. When the TXD signal is negative, the base-emitter junction of transistor 100 is reverse biased so that no current flows through light emitter 66 (i.e., light-emitting diode). When the TXD signal is positive, the base-emitter junction of transistor 100 becomes forward biased through resistor 102, thereby turning on transistor 100 and allowing current to flow through the light emitter 66. Current flowing through light emitter 66 then flows through diode 104 and resistor 106 so that the voltage across resistor 104 is proportional to the current through the light emitter 66. When the voltage across the resistor 106 reaches about 0.7 volts, the base-emitter junction of transistor 108 becomes forward biased, thereby turning on transistor 108 and causing it to draw current through resistor 110 and resistor 102. As the current flow through resistor 102 increases, the voltage that transistor 100 applies to light emitter 66 decreases. The resistors 106, 110 and transistor 108 thus function as a current-limiting circuit to limit the current through the light emitter 66 to a predetermined value.

The receiver portion of the interface circuit 65, like the interface circuit 40, maintains a substantially constant voltage across a phototransistor serving as the light detector 68. The base of transistor 120 is grounded so that transistor 120 continuously applies about −0.7 volt to the collector of the phototransistor 68. The emitter of the phototransistor 68 is connected to the negative power supply voltage so that the voltage across the phototransistor is constant. When the phototransistor is not detecting light, it is at cutoff so that transistor 122 is biased to cutoff through resistor 124. Under these circumstances, the collector of transistor 122 is held at the negative power supply voltage through resistor 128. The collector of transistor 122 is connected to a pair of transistors 130, 132 arranged as bipolar emitter followers. The transistors 130, 132 thus output the negative power supply voltage when the phototransistor does not detect light.

When light is applied to the phototransistor 68, the phototransistor becomes conductive, thereby drawing current through resistor 124 and resistor 134. As the voltage across resistor 124 drops, transistor 122 turns on, thereby pulling the bases of emitter follower transistors 130, 132 to the positive supply voltage. Transistor 130 then outputs the positive supply voltage as the RXD signal when the phototransistor 68 is detecting light.

In operation, battery 50 is disconnected from the circuitry in the blood pressure recorder 10, including the interface circuit 40, when the connector 24' is not inserted in the connector 28. As a result, the life of the battery 50 is preserved between replacement or recharging. When the connector 24' is inserted in the connector 28, the magnetic field generated by the magnet 62 closes the reed switch 42, thereby applying power from the battery 50 to the circuitry in the recorder 10, including the interface circuit 40. Data communication to the recorder 10 then occurs from the light emitter 66 to the light detector 32, and to the readout device 10 from the light emitter 30 to the light detector 68, as explained above.

Although the optical data link has been described for use with a blood pressure recorder 10, it will be understood that it can be used with any electronic device in which data transfer and automatic circuit activation are to be provided. Also, unidirectional data transfer can be accomplished by using a single light emitter and a single light detector. Multiple data channels can also be provided by using multiple pairs of light emitters and light detectors. Finally, although the magnetically sensitive reed switch 42, light emitter 30 and light detector 32 are shown as mounted on a circuit board 34 of the recorder 10, they could be mounted in a connector that is attached to the recorder 10 or other device through a cable.

I claim:

1. An optical data link for transferring data from a first connector to a second connector while actuating an electrical device connected to said second connector when said first and second connectors engage each other, said data link comprising:
   a magnet mounted in said first connector;
   a first optical communication component mounted in said first connector;
   a magnetically sensitive switch mounted in said second connector so that, when said first and second connectors engage each other, the magnetic field from said magnet closes said switch, said switch being connected to said electrical device to activate said electrical device when said switch is closed; and
   a second optical communication component mounted in said second connector at a position where it is visible to said first optical component when said first and second connectors engage each other, said second optical communication component being electrically connected to said electrical device, one of said optical communication components emitting light as a function of a binary data signal and the other of said optical communication components detecting light emitted by said optical communication component to recover said binary data signal whereby said data signal is transferred between said first connector and said electrical device.

2. The optical data link of claim 1 wherein said light is emitted by said first optical communication component and said light is detected by said second optical communication component whereby data is transferred from said first connector to said electrical device.

3. The optical data link of claim 2, further including a second light-emitting optical communication component mounted in said second connector and a second light detecting optical communication component mounted in said first connector to provide bidirectional data transfer to and from said electrical device.

4. The optical data link of claim 1 wherein said light is emitted by said second optical communication component and said light is detected by said first optical communication component whereby data is transferred to said first connector from said electrical device.

5. The optical data link of claim 1 wherein said second connector is mounted directly on said electrical device.

6. The optical data link of claim 1 wherein said light detecting optical component is a phototransistor.

7. The optical data link of claim 6, further including an interface circuit connected to said phototransistor, said interface circuit including means for maintaining a substantially constant voltage across said phototransistor to allow said phototransistor to function as a current switch.

8. The optical data link of claim 1 wherein said light-emitting optical component is a light-emitting diode.

9. The optical data link of claim 8, further including an interface circuit connected to said light-emitting diode, said interface circuit including means for limiting the current flow through said light-emitting diode when said binary data signal is applied to said light-emitting diode through said interface circuit.

10. An optical data link for transferring data between first and second connectors and for generating an actuating signal when said connectors are interconnected, said data link comprising:
 a magnet mounted in said first connector;
 a first optical communication component mounted in said first connector;
 a magnetically sensitive switch mounted in said second connector so that, when said first and second connectors are interconnected, the magnetic field from said magnet closes said switch, said switch generating said actuating signal when said switch is closed; and
 a second optical communication component mounted in said second connector at a position where it is visible to said first optical component when said first and second connectors are interconnected, one of said optical communication components emitting light as a function of a binary data signal and the other of said optical communication components detecting light emitted by said optical communication component to recover said binary data signal.

11. The optical data link of claim 10 wherein said light is emitted by said first optical communication component and said light is detected by said second optical communication component whereby data is transferred from said first connector to said second connector.

12. The optical data link of claim 11, further including a second light-emitting optical communication component mounted in said second connector and a second light detecting optical communication component mounted in said first connector to provide bidirectional data transfer between said electrical connectors.

13. The optical data link of claim 10 wherein said light is emitted by said second optical communication component and said light is detected by said first optical communication component whereby data is transferred to said first connector from said second connector.

14. The optical data link of claim 10 wherein said light detecting optical component is a phototransistor.

15. The optical data link of claim 14, further including an interface circuit connected to said phototransistor, said interface circuit including means for maintaining a substantially constant voltage across said phototransistor to allow said phototransistor to function as a current switch.

16. The optical data link of claim 10 wherein said light-emitting optical component is a light-emitting diode.

17. The optical data link of claim 16, further including an interface circuit connected to said light-emitting diode, said interface circuit including means for limiting the current flow through said light-emitting diode when said binary data signal is applied to said light-emitting diode through said interface circuit.

18. A method of transferring digital data between first and second connectors and indicating when said first and second connectors are interconnected, said method comprising:
 transmitting light from one of said connectors in accordance with said digital data;
 detecting said light at the other of said connectors;
 generating a magnetic field from said first connector; and
 detecting said magnetic field at said second connector, thereby providing an indication that said first and second connectors are interconnected.

19. The method of claim 18 wherein said magnetic field is detected by mounting a magnetically sensitive reed switch in said second connector.

20. The method of claim 18 wherein said light is transmitted from a light-emitting diode mounted in one of said connectors.

21. The method of claim 18 wherein said light is detected by a phototransistor mounted in one of said connectors.

* * * * *